US009571353B1

(12) United States Patent
Chheda et al.

(10) Patent No.: US 9,571,353 B1
(45) Date of Patent: Feb. 14, 2017

(54) COMPACT SERVICE STATUS PROCESSING

(71) Applicant: Amazon Technologies, Inc., Reno, NV (US)

(72) Inventors: Mahendra Manshi Chheda, Sammamish, WA (US); Daine Mimico Neale Mamacos, Cape Town (ZA); Suvenderan Pillay, Cape Town (ZA); Christian Arne Haselbach, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 320 days.

(21) Appl. No.: 14/303,406

(22) Filed: Jun. 12, 2014

(51) Int. Cl.
  *G06F 15/173* (2006.01)
  *H04L 12/24* (2006.01)
(52) U.S. Cl.
  CPC .................................... *H04L 41/50* (2013.01)
(58) Field of Classification Search
  None
  See application file for complete search history.

(56) References Cited

U.S. PATENT DOCUMENTS

| | | | | |
|---|---|---|---|---|
| 5,734,641 A | * | 3/1998 | Kawasaki | H04L 29/06 370/235.1 |
| 2007/0283194 A1 | * | 12/2007 | Villella | G06F 11/3476 714/57 |
| 2009/0138427 A1 | * | 5/2009 | Kalavade | G06Q 10/0637 |
| 2011/0314148 A1 | * | 12/2011 | Petersen | G06F 11/3476 709/224 |
| 2012/0005542 A1 | * | 1/2012 | Petersen | G06F 11/0709 714/48 |
| 2012/0131185 A1 | * | 5/2012 | Petersen | H04L 41/069 709/224 |
| 2014/0289325 A1 | * | 9/2014 | Solis | G06Q 10/00 709/204 |
| 2015/0039757 A1 | * | 2/2015 | Petersen | H04L 63/0227 709/224 |

* cited by examiner

*Primary Examiner* — Brian P Whipple
(74) *Attorney, Agent, or Firm* — Baker & Hostetler LLP

(57) ABSTRACT

Hosts for virtual computing nodes may communicate health and status information through a low-bandwidth interface. Event descriptions evolving over time may be communicated through a fixed-length bit field whose format also evolves over time. Information describing the evolving data format may be communicated through an out-of-band communications channel. Event descriptions transmitted using the evolving data format may be processed once the format is accessible to the recipient of the event descriptions.

20 Claims, 8 Drawing Sheets

COMPACT SERVICE STATUS PROCESSING

BACKGROUND

A provider may host various computing services on behalf of its customers. The computing services may be hosted on virtual computing nodes that share the resources of a physical computer. A number of virtual computing nodes may operate on each physical computer. In addition, a number of different service types may operate on each virtual computer. The number and diversity of virtual computing nodes and service types may present a number of challenges to the provider. One of these involves the reporting and management of errors and other events that occur on the services, virtual computing nodes, and physical computers. The provider may collect information concerning such events and process the information by performing various actions, such as storing the event data, preparing reports based on the data, communicating error conditions to customers, taking corrective action and so forth.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
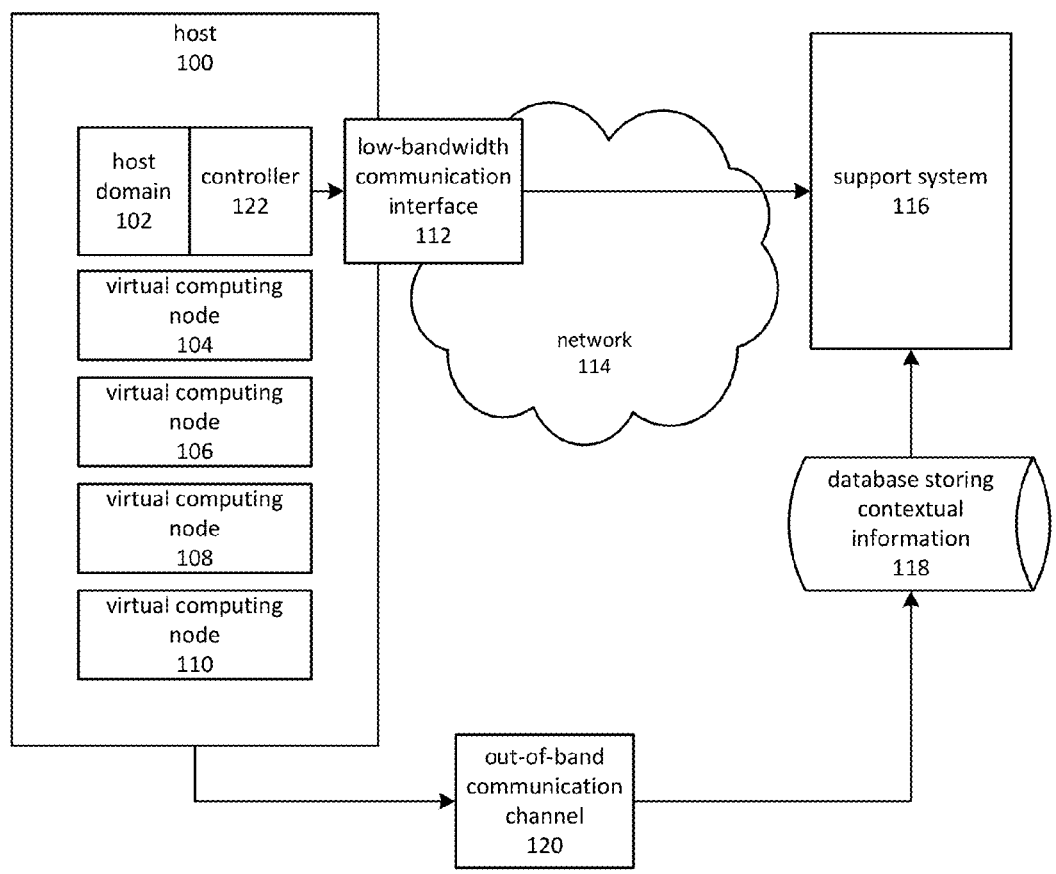
FIG. 1 depicts an example of an embodiment of a system comprising an event reporting mechanism operating within a host domain.

Virtualized computing resources, which may be referred to as virtual computing nodes, may be hosted on one or more physical computing devices and managed by a host domain of the computing devices. The host domain may comprise a partitioned subset of the resources available to the one or more computing devices. The host domain may be referred to as, or comprise, a virtual machine monitor, host partition, hypervisor, domain-zero, "dom0" or other software and/or hardware component for managing virtual machines and other virtualized computing resources.

For various reasons, including but not limited to economic reasons, the resources available to a host domain may be limited. A host domain may, for example, operate as many virtual computing nodes on the one or more computing devices as possible, which may result in fewer computing resources being available for use by the host domain.

One example of a function that may be performed by the host domain involves reporting and diagnostic capabilities. The host domain may communicate information pertaining to various events that may occur on the virtual computing nodes or on the host domain itself. The information may be sent to various support systems over a network where it may be processed. However, due to constraints on the resources available to the host domain, network bandwidth available to the host domain may be limited. This may be due to the capabilities of hardware assigned to the host domain or to other reasons, such as the limited allocation of network bandwidth shared between the host domain and the virtual computing nodes. There may also be, in some cases, a high volume of data to be transmitted. It might also be the case that the use of very low network bandwidth interfaces may allow relatively inexpensive hardware to be used. This may allow for significant cost savings, particularly in the context of a data center where a very large number of hosts may be in operation. For these and other reasons, event reporting mechanisms operating in the context of a host domain may utilize transmission formats that are more compact than would normally be expected, particularly as compared to reporting mechanisms that operate outside the context of a host domain.

As an illustrative example, a physical computing node might serve as a host to a number of virtual computing nodes. A virtual computing node might provide a number of services, such as hypertext-transfer protocol ("HTTP") web services, database services and so forth on behalf of various clients. The mix of virtual computing nodes and the type and number of services they provide may change over time, as virtual computing nodes and services are added or removed from the system. As a result of this changing environment, the set of possible failure conditions may be quite large. It may, therefore, be difficult to encode a compact representation of events such as error conditions using conventional techniques. It may also be the case that the bandwidth for transmitting information about events occurring on the host is limited, for reasons such as those described above. Conventional methods of encoding may be unable to adequately represent the changing mixture of events occurring on the host in a compact format. Accordingly, aspects of the present disclosure may be employed to transmit event information using a compact, fixed-length format while also allowing the format to adapt to the environment as it changes over time.

Embodiments may perform various operations to determine a data format for reporting information describing these events using a compact data structure. In some embodiments, this may be a fixed-length data structure whose length is on the order of four, eight or sixteen bytes. Determining the format may involve selectively including and excluding certain events from the format based on factors such as the relative frequency of an event or the relative importance of an event. The format may also be determined by subdividing the available space in the fixed-length data structure based on factors such as the relative frequency of the data to be stored within each region of the fixed-length data structure. For example, assume that four services operate on a host, and each service is capable of generating the same eight types of errors. Two bits might then be allocated to represent services, and three bits might be allocated to represent the eight types of errors. Alternatively, two bits might be selected to represent four different types of errors, and four additional types might be excluded from the encoding.

Events occurring on the host may be transmitted through a low-bandwidth interface to another device for processing. As noted, the host may utilize a low-bandwidth interface for this purpose in order to maximize the resources available for operating the virtual computing nodes and the services that run on them. After transmission, an appropriate action may be taken to respond to the event. This action may include various operations such as communicating information about the event to a client, coordinating remedial actions to correct or diagnose the event and so on.

In order to process the event information received in the encoded fixed-length data structure, embodiments may utilize a database containing definitions of the data format. The definitions may include information such as the number of subdivided regions within the fixed-length structure, the number of bits allocated to each region, an indicator of what data each region contains and the mappings between encoded values and actual values. Event information, encoded into a fixed-length data structure, may then be decoded using information stored in a database. The encoding process may involve determining how the regions of the fixed-length structure are divided, extracting values from within those regions and applying the mapping information to determine the actual values that correspond to the encoded values.

However, the combination of services and events may change over time. To address this, a new data format may be defined periodically and transmitted to the database. The data format may be lengthy compared to the fixed-length data structure. Accordingly, the data format may be transmitted to the database through some means other than the low-bandwidth interface or with the low-bandwidth information during a time of relatively little use. This process may be described as using an out-of-band communications channel. The data format may also be determined and programed into the database using non-automated means. However, even in this case, an out-of-band communications channel may be employed to transmit the information needed to determine the data format from the host to an alternate location. As used herein, the term out-of-band communication channel may refer to a distinct communications method. It may also refer to the low-bandwidth interface used for transmitting the fixed-length data structures that describe events, for example by using a communications channel that minimizes disruption to the flow of event information while allowing the data format information to be transmitted during periods of comparatively low usage.

An additional aspect of the approach is that data represented by the new format may be transmitted using the new format regardless of whether or not the recipient of the data is aware, at the time of transmission, of the format used to transmit the data. This may allow embodiments to dynamically adjust encodings and to report new event types even though the available bandwidth is limited. In general terms, this may involve storing the data whose format is not yet known to the recipient and processing it at a subsequent time when the recipient of the data also receives the corresponding format information. It may also involve various techniques for identifying the version of the format information used to encode the data. These techniques may include rolling version numbers, time of receipt information and so on.

FIG. 1 depicts an example of an embodiment of a system comprising an event reporting mechanism operating within a host domain. A host 100 may comprise a host domain 102, which may provide support for various virtual computing nodes, such as virtual computing nodes 104, 106, 108 and 110. Various programs or processes, which may be referred to herein as services, may operate on virtual computing nodes 104-110. In the course of operation, these services may encounter various events, such as error conditions. The system depicted by FIG. 1 may include a support system 116 for processing information pertaining to events generated by host 100, host domain 102, virtual computing nodes 104-110 or various services operating thereon. The system may send event information from host domain 102 through a low-bandwidth communication interface 112 over network 114 for receipt by support system 116. The host domain 102 may be associated with a controller 122. The controller 122 may be a hardware device such as a baseboard management controller, console card, remote management card and so on. As used herein, the term controller may refer to devices of this type. Controller 122 may provide various functions for managing host 100. These may include performing actions such as power on, power off, hard reset and so forth. Controller 122 may also perform various diagnostic functions such as detecting and reporting problems occurring on attached storage devices, detecting memory faults and so forth. Controller 122 may have an on-board interface acting as a component of low-bandwidth communication interface 112. In some cases, the on-board interface may be a serial interface or other interface with low communications bandwidth.

A low-bandwidth communication interface 112, as depicted by FIG. 1, may comprise a variety of mechanisms that communicatively couple host domain 102 with network 114. This may comprise one or more network cards operative on host 100 and shared between host domain 102 and virtual computing nodes 104-110, a network card dedicated to host domain 102, a network interface integrated with another component—such as a motherboard—and so forth. The mechanism may in some cases and embodiments have inherent limitations with respect to bandwidth, but in other cases and embodiments other factors may be indicative of using a low-bandwidth reporting mechanism. This may be the case, for example, when a network interface is shared between host domain 102 and virtual computing nodes 104-110, or when data volumes are high.

A host domain 102 may transmit event information using a data format that is encoded based at least in part on the frequency of events that have occurred on host 100 during a period of time. Encoding based on the frequency of events may comprise further encodings based on the frequency of various elements that may be used to describe aspects of an event. These elements may include, but are not limited to, the service to which an event was related, the computing node on which an event occurred, the name of an event and so forth. In some embodiments of the depicted system, the most frequently recurring elements may be represented by the most compact representation. In other embodiments, the most frequently recurring elements may be encoded and therefore may be represented by an instance of the data format. The least-recurring elements may in some cases be represented by alternative formats or not reported.

A database storing contextual information 118 may be maintained to provide information usable by support system 116 to decode event information sent to it from host domain 102. For example, host domain 102 may transmit data using a compact structure that corresponds to an event. The particular type of event may be indicated in the fixed-length, compact data structure by an encoded value. The database storing contextual information 118 may contain information, such as a translation table, that is usable by support system 116 to determine, from the encoded value, which event has occurred. Support system 116 may then process the event, for example, by causing a remedial action to be taken or by recording the event in a log file.

The various events that occur on host 100 may change over time. This may, for example, be the result of adding a virtual computing node to virtual computing nodes 104-110 or removing a virtual computing node. Other factors that may cause events occurring on host 100 to change over time include, but are not limited to, new services being performed by virtual computing nodes 104-110, previously encountered errors occurring with greater frequency, new error conditions and so on.

Changes to the set of events occurring over time on host 100 may cause previously efficient encodings to become inefficient. Embodiments of the depicted system may perform a re-encoding based on a second period of time to determine, based on the frequency of events (including the frequency of various elements that may be used to describe the event), a new encoding. Information pertaining to the new encoding may be sent through an out-of-band communication channel 120. This may comprise various means of communicating with or loading information into a database storing contextual information 118, and thereby allowing support system 116 to decode representations of events occurring on host 100.

Figure 2:
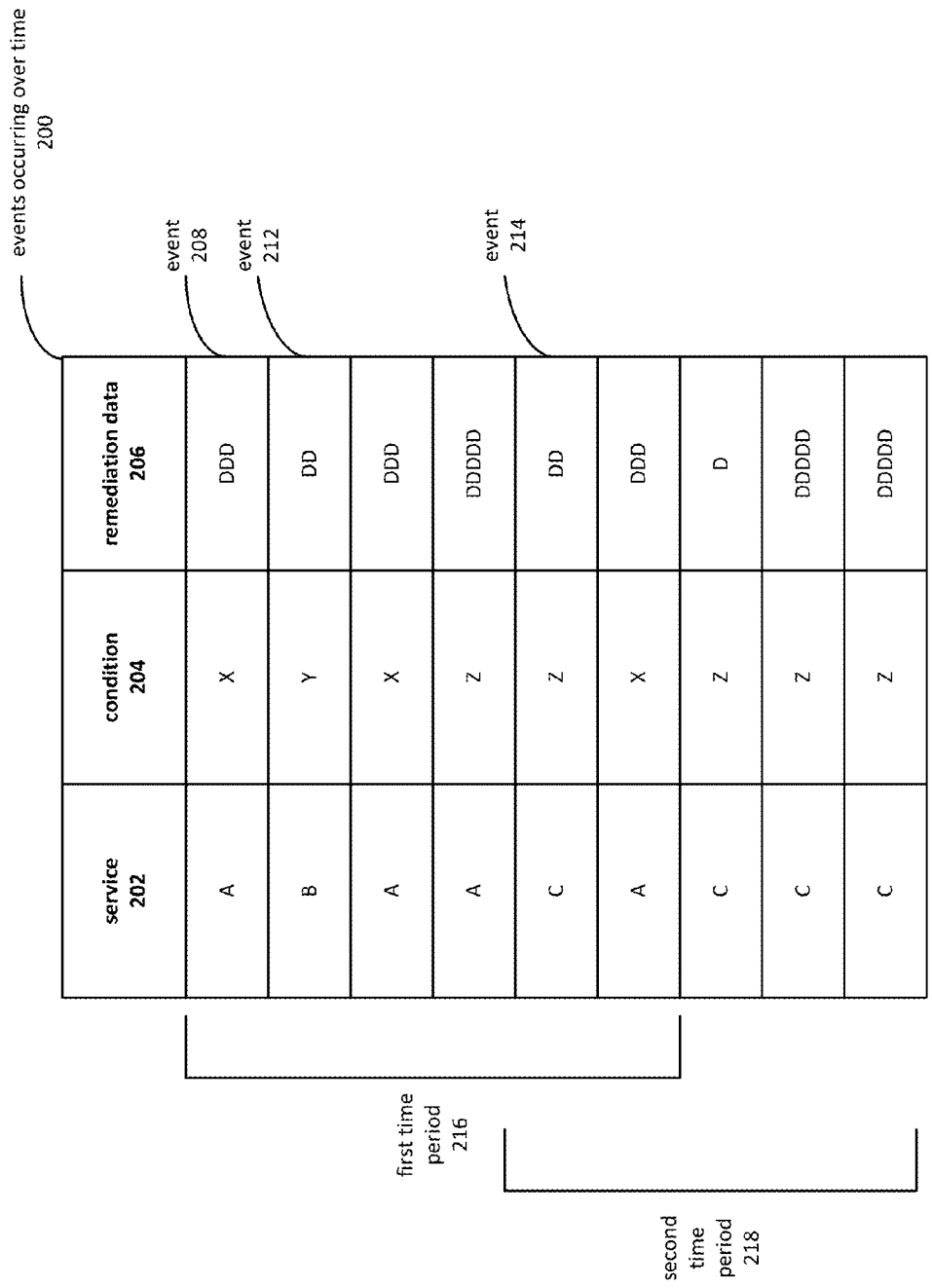
FIG. 2 depicts an example of changing event frequencies that may be reflected by successive iterations of encodings.

FIG. 2 depicts an example of changing event frequencies that may be reflected by successive iterations of encodings. Events occurring over time 200 are depicted in FIG. 2 using a table format comprising a service 202 column, condition 204 column and remediation data 206 column. Entries in the service 202 column may relate to a particular service with which a corresponding event is associated. For example, a service may be hosted on a virtual computing node in order to process various requests to perform data processing operations. In FIG. 2, services associated with events are depicted as "A," "B" and "C." Entries in the condition 204 column may relate to a particular type of event associated with the service or an event that occurred while the service was attempting to perform the data processing operation. A condition could, for example, indicate that the data processing operation could not be completed. In FIG. 2, the conditions associated with events are depicted as "X," "Y" and "Z." There may be additional data associated with the event. The additional data may be useful for taking various remediation steps in response to the event, such as diagnosing the problems that caused the event. This data is depicted in the remediation data 206 column. Each event may be associated with different remediation data, which is depicted in FIG. 2 by entries in remediation data 206 column such as "DD," "DDD" and so forth. One example of this type of data is information describing the parameters used to invoke the request to perform a data processing operation. This type of information may be included in the fixed data format as remediation data which may be used to diagnose or otherwise respond to the event.

It will be appreciated that the table format used in FIG. 2 is intended to be illustrative and should not be construed as implying that event information is necessarily stored in a table or in row-and-column format. The order of the depicted rows is intended to reflect, for illustrative purposes, the relative order in time of the depicted events. For example, event 208 is depicted as occurring prior to event 212, which in turn is depicted as occurring prior to event 214.

Analysis of data recurrence within a given time frame may determine that certain events occur with greater frequency than other events. For example, within a first time period 216, various embodiments may determine that events occurring in connection with service "A," as indicated in the service 202 column, occur with greater frequency than services "B" and "C." Embodiments may, based on this analysis, determine to encode "A" using a compact encoding, whereas "B" or "C" might be excluded from encoding and subsequent transmission, or might be encoded using a less compact format. During a second time period 218, and event such as "C" might become more prevalent and therefore might be included in the encoding. In addition, the data associated with events may also change over time. For example, the data "DDDDD" might begin to be associated with events more frequently than other data, such as "D" or "DDD," as depicted in FIG. 2.

In some cases and embodiments, encoding may be based on the frequency of values within a particular column, such as the service 202 column referred to in the example of the preceding paragraph. In other cases and embodiments, data pertaining to an event may be analyzed based on the frequency with which a particular combination of events occurs. For example, analysis may determine that the combination of values seen in event 208 ("A," "X," "DDD") frequently recurs. Accordingly, this combination of values might be encoded using a compact encoding. A similar approach may be applied to a subset of values associated with events, such as combinations of service 202 and condition 204 values. For example, the combination of ("A," "X") could be encoded using a compact representation, while less frequent combinations, such as ("A," "Z"), could be encoded using less compact representations or omitted from the encoding.

Figure 3:
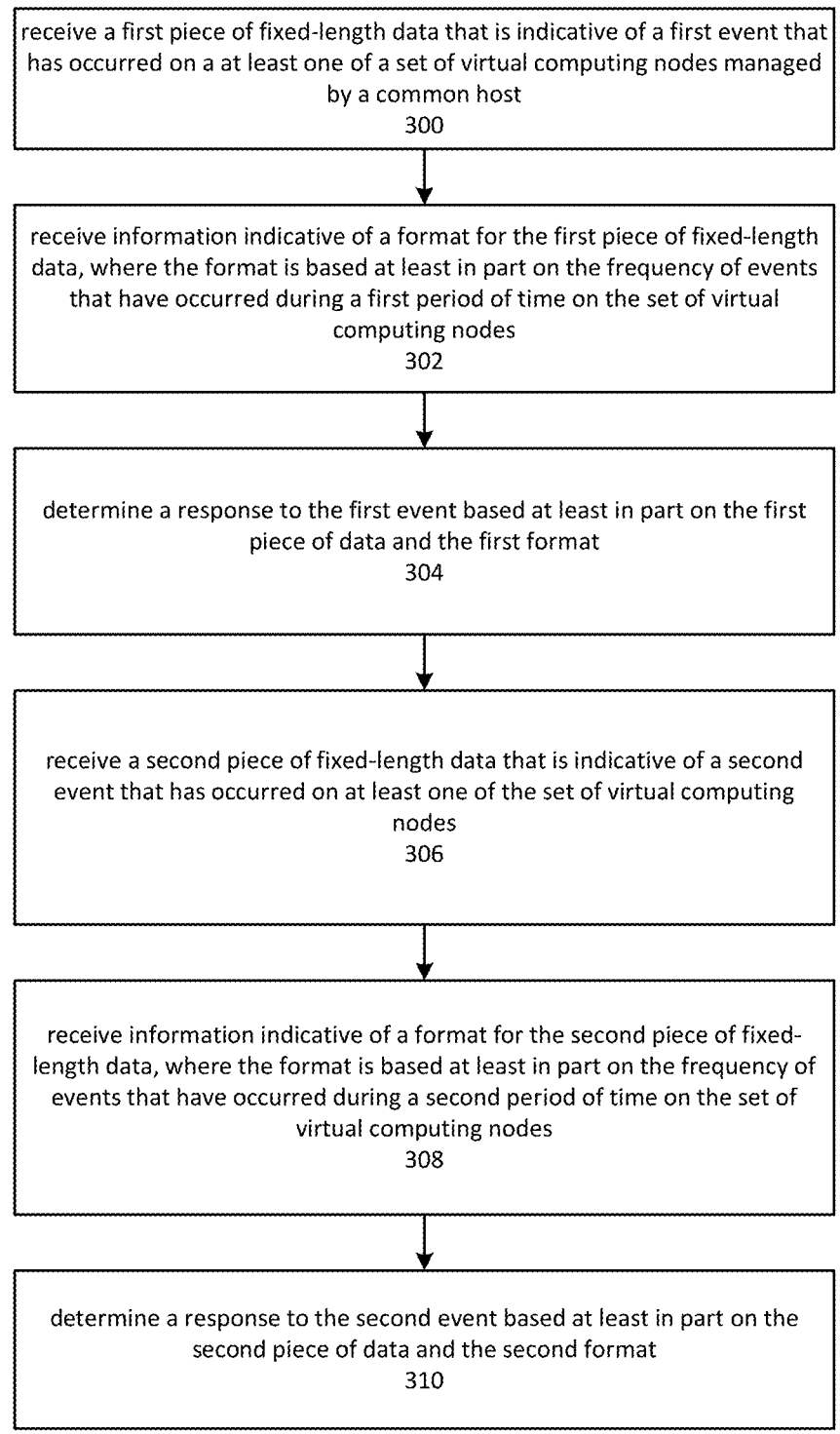
FIG. 3 depicts an embodiment of a process for processing information transmitted from a host domain to a support system.

FIG. 3 depicts an embodiment of a process for processing information transmitted from a host domain to a support system. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel.

Operation 300 involves receiving a first piece of fixed-length data that is indicative of a first event that has occurred on at least one of a set of virtual computing nodes managed by a common host. In some cases and embodiments, the first piece of fixed-length data may correspond to multiple events, such as events that tend to occur in sequence. The data may be transmitted from a host domain to a support system for processing. The data may be received, for example, by a support system for processing. The data may be in an encoded representation that may vary over time. In some cases and embodiments, the piece of data may be in a compact representation, such as a representation that is two to four bytes long. In some embodiments, the format for the data may be defined as a fixed-length structure. In some embodiments the length of the fixed-length structure may vary over time as new encodings are constructed. In some embodiments, variable-length structures may be employed. In some cases, header information may be indicative of the length or the piece of data, or the length might be implied from version information embedded in the data.

Operation 302 involves receiving information indicative of a format for the first piece of fixed-length data, where the format is based at least in part on the frequency of events that have occurred during a first period of time on the set of virtual computing nodes. In various cases and embodiments, this information may be received before or after receipt of the encoded information. Prior receipt may allow for the immediate processing of the data, for example, where such processing involves performing various remedial functions based on the information. The format information, if received after the piece of data it describes, may be employed in conjunction with embodiments that retain event information for subsequent processing. The information describing the format may indicate a division of a fixed-length portion of data into a number of regions and an encoding of data stored within each region. In various embodiments, the information may comprise indications of how many bit fields are defined in the format, how large each bit field is and what each possible value within each bit field means.

As an example, two bits may be reserved to indicate a version number of the data format, an additional two bits to contain encoded representations of certain services operating on virtual computing nodes running on the host, four bits to contain an encoded representation of the condition and eight bits to represent remediation data, which may be described as additional data included in the fixed-length data that may be used to diagnose, process or otherwise respond to an event described by the fixed-length data. This example is intended to be illustrative only, and numerous other formats are possible. Encoding may, in various embodiments, be done by mapping values that may be represented in the available space to an actual value. For example, if two bits are allocated to represent the service associated with an event, the values 0-3 are possible values and may be mapped to up to four different services. Similarly, if eight bits are allocated as remediation data, the values 0-255 may be mapped to up to 256 different sets of remediation data. In some embodiments, one or more values may be reserved for defaults. For example, in the example involving encoding values indicative of services, the value 0 might be reserved to map to a plurality of services that could not be represented individually in the encoding.

Operation 304 involves determining a response to the first event based at least in part on the first piece of data and the first format for the data. In various embodiments, this may comprise extracting values from within each region of the first piece of data, based on the first format. Determining the response may also involve identifying the service, condition and remediation data associated with each event based on information contained in the first format.

Operation 306 involves receiving a second piece of fixed-length data that is indicative of a second event that has occurred on at least one of the set of virtual computing nodes. The data may be received, for example, by a support system for processing. As with the first format for the data, the system receiving the data may have not yet received an indication of its format. In such cases, embodiments may store the data for subsequent processing.

Operation 308 involves receiving information indicative of a format for the second piece of fixed-length data, where the format is based at least in part on the frequency of events that have occurred during a second period of time on the set of virtual computing nodes. The second period of time may overlap with the first period of time, but some portion of the second period may be subsequent to the end of the first period. Some embodiments may, for example, base encoding on all events that have occurred previously, so that the second period of time encompasses both the first period of time and a subsequent period of time. Other embodiments may base encoding on a sliding window approach or use entirely separate time frames, in which case the first and second periods of time would not overlap.

Operation 310 involves determining a response to the second event based at least in part on the second piece of data and the second format. This operation may be performed in a manner similar to the processing of the first piece of data using the first format, using the second format to parse the second piece of data.

Figure 4:
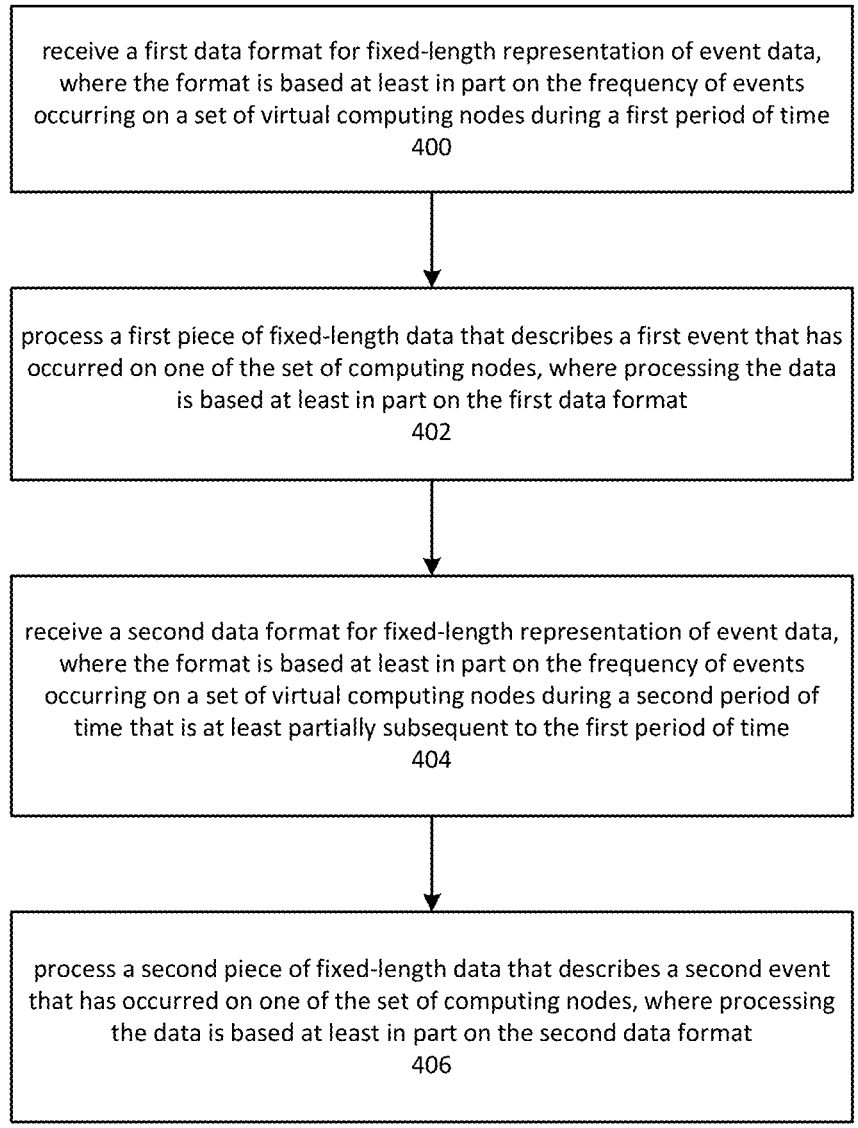
FIG. 4 depicts an embodiment of a process for receiving and responding to a stream of encoded data corresponding to events occurring on a set of virtual computing nodes.

FIG. 4 depicts an embodiment of a process for receiving and responding to a stream of encoded data corresponding to events occurring on a set of virtual computing nodes. As used herein, responding to an event may include taking any number of various types of actions, such as writing a record of the event to an event log, sending alert messages to technical personnel, initiating further diagnostic actions, taking a computing node offline and so on. Although FIG. 4 is depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel.

Operation 400 involves receiving a first data format for fixed-length representation of event data, where the format is based at least in part on the frequency of events occurring on a set of virtual computing nodes during a first period of time. Basing the format on a frequency of events may involve analysis of the frequency of recurrence of various elements that describe the event, such as the frequency of events that pertain to a particular service, a particular event identifier, supplemental data and so forth. Some embodiments may analyze recurrence patterns for combinations of elements, and base the data format on that analysis. In general terms, the most frequently occurring patterns may be represented by the most compact representations, while the least frequently occurring patterns may be represented by the least compact representations or may be excluded from the format altogether. In the latter case, some embodiments may include in the data format a means of reporting events that fall into a class of unencoded events. Embodiments may utilize an out-of-band communications channel or an alternative or extended protocol to retrieve additional information about this type of event.

The first data format may be received before or after the data to which it pertains. Receiving the data may be in response to a request for the encoding information from a database, such as the database storing contextual information 118 depicted in FIG. 1. In some embodiments, an out-of-band communications channel 120 may be employed to send information describing data formats to a database for storage. Use of an out-of-band communications channel 120 for this purpose allows low-bandwidth communications interface 112 to broadcast event data using a compact representation even if the data sent over the interface is not able to be immediately understood by the recipient, in this case support system 116.

Operation 402 involves processing a first piece of fixed-length data that describes a first event that has occurred on one of the set of virtual computing nodes, where processing the data is based at least in part on the first data format. Processing the data may involve parsing and/or data extraction operations based on the data format. The data format may comprise a mapping of a bit field to compact representations of information relevant to the events being described. A bit field may also be referred to as a region, bit region, bit vector and so forth.

As an example of a data format, an analysis of events occurring within the first period of time may indicate that events in the time period predominately relate to four services. Based at least in part on this information, embodiments might reserve two bits in the data format to represent services, which may be encoded as the values 0-3. The data format may also comprise a mapping of the values 0-3 to specific identifiers for each service. A similar approach may be utilized to encode other types of information into the data format.

At operation 404, an embodiment may receive information describing a second data format for fixed-length representation of event data, where the format is based at least in part on the frequency of events occurring on a set of virtual computing nodes during a second period of time that is at least partially subsequent to the first period of time. This information may have also been retrieved from a database or other data repository. The database may have been updated to contain the information using various techniques. One possible approach is depicted in FIG. 1, which shows transmitting updates from host 100 to a database storing contextual information 118 through an out-of-band communication channel 120.

Operation 406, which may precede or follow operation 404, may involve processing a second piece of fixed-length data that describes a second event that has occurred on one of the set of computing nodes, where processing the data is based at least in part on the second data format. The second format may be adjusted from the first data format so that it more efficiently represents events occurring more recently.

Embodiments may employ a number of different approaches to determine when a particular data format should be applied to data that is being processed. One possible approach is based on a protocol between the sender and the recipient that an applicable data format will be sent prior to the transmission of any data that is encoded using the new data format, and that any data sent subsequent to that point will conform to the new data format. Another possible approach is to reserve some portion of the data format to represent a version identifier. Due to space limitations, some embodiments may reserve only a small portion of the data format for version identification and allow the version number to roll over. Yet another possible approach is to employ a status bit indicator in the data format that indicates that the sender is requesting to broadcast data in a new format, and that the recipient should proceed to obtain the new format data and indicate when it is ready to receive data in the new format.

As noted, it may be the case that a particular data format, corresponding to a particular version of the data, is not available when the data is initially received. Embodiments may store received data in a log file, database or other similar mechanism pending receipt of updated format information. Upon receipt of the updated information describing a data format, embodiments may compare version information associated with the newly received format to unprocessed information in a log file, database or other mechanism. Embodiments utilizing rolling version numbers may utilize time of receipt information to determine a period of time in which a version may be considered valid. For example, embodiments may associate a time-to-live value with received event data, in which the time-to-live value corresponds to the length of time it takes for version numbers to roll over. Another approach, which may be employed by some embodiments, is to associate format versions to specific time frames. For example, an embodiment might define an updated data format once per day, and presume that any event information received during that time frame corresponds to that day's data format.

Figure 5:
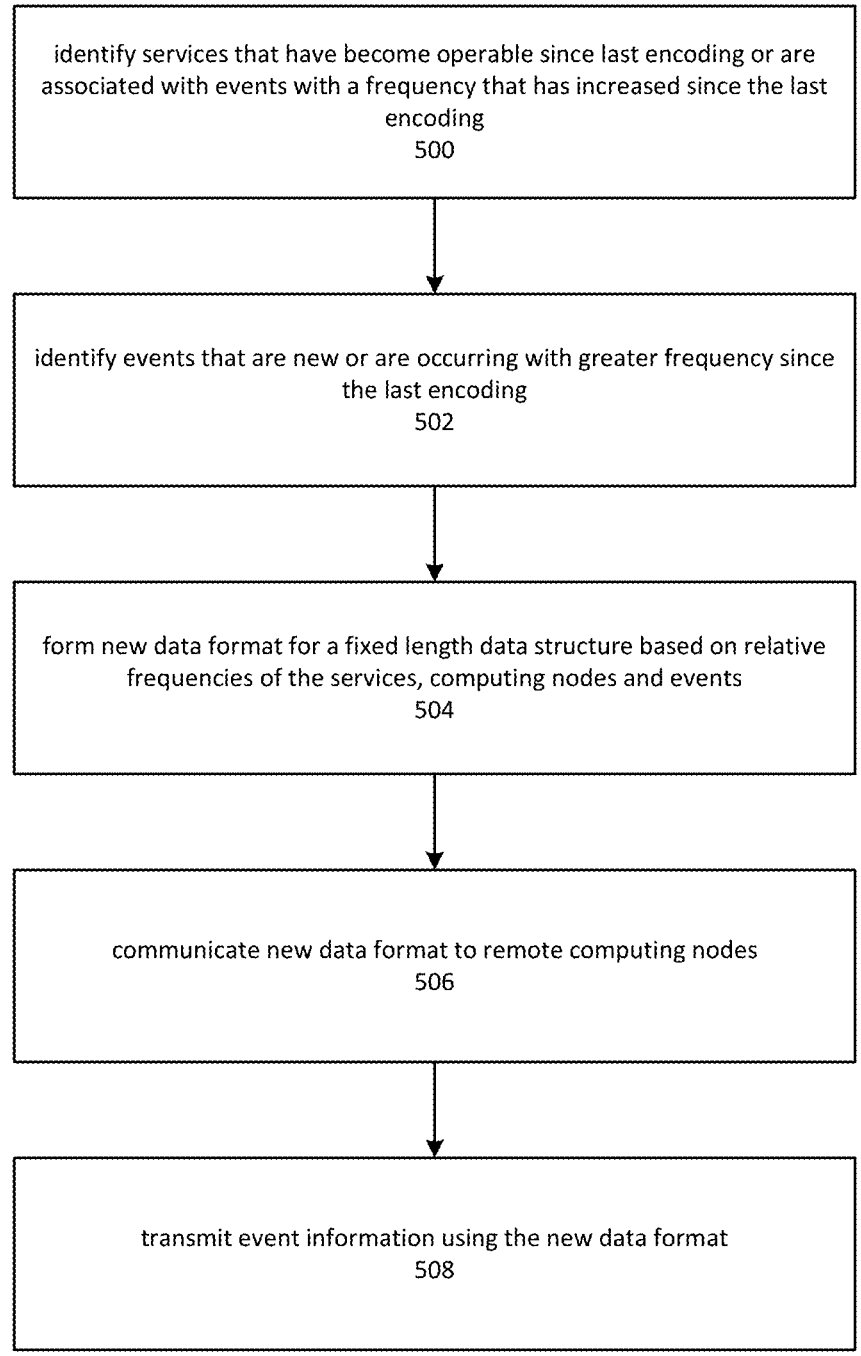
FIG. 5 depicts an embodiment of a process for encoding representations of events occurring on one or more of a set of virtual computing nodes.

FIG. 5 depicts an embodiment of a process for encoding representations of events occurring on one or more of a set of virtual computing nodes. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel.

Encoding of events may be based on an analysis of events that have occurred on a set of virtual computing nodes. In some embodiments, the analysis may be based on a prediction of future events, either independently or in conjunction with analysis of events that have already occurred.

Operation 500 involves identifying services that have become operable since the last encoding or are associated with events with greater frequency than was the case when the last encoding was done. It may be the case, for example, that new services have become operable on the virtual computing nodes since the last time a data format was defined. It might also be the case that an existing service has begun to encounter an error that has not occurred before or occurred only infrequently. A similar pattern may occur with respect to events. Operation 502 involves identifying events that are new or are occurring with greater frequency since the last encoding.

As depicted in FIG. 5, operation 504 involves forming a new data format for a fixed-length data structure based on the relative frequencies of events, services to which the events pertain, computing nodes on which the events occur and so on. Embodiments may base the data format on additional or alternative factors, such as status identifiers, string values and so forth. This may involve identifying particular combinations of data that occur with a frequency that is above or below a threshold value, or is relatively high or low compared to other combinations. Embodiments may determine to form the new data structure based on various factors. For example, some embodiments may form new data structures on a scheduled basis or on an ad-hoc basis. Embodiments might form a new data format based on determining that the statistical frequency of certain elements, such as service identifiers, has changed beyond a threshold level. In an embodiment, a new data structure is calculated in response to a new virtual machine or a new service being added. These aspects of embodiments may, for example, be performed through the use of computer-readable instructions executed by a host. Another approach is to utilize a computing node external to the host, but with access to log files or other information in which raw or untransmitted event information is stored. The host and the computing node external to the host could, for example, be connected to the same storage area network.

Operation 506 involves communicating the new data format to a remote computing node. This may be performed before or after operation 508, which involves transmitting event information using the new data format. The remote computing node may store the data format received at operation 506 for later use when data that uses the new format is also received at the remote computing node. The data format may contain information identifying the version of the data format used to encode the data. Due to space limitations, the version information may consume a small number of bytes, and may roll-over when a new version number could not otherwise be represented in the available space.

At operation 508, information describing events may be transmitted using the new data format. The data may be transmitted to a remote computing device for storage, such as in the database storing contextual information 118 depicted in FIG. 1. The transmission may be accomplished through a variety of means, such as the use of an out-of-band communications channel. The channel may, for example, comprise a primary network interface of a host computer that is separate from the low-bandwidth channel used to transmit event information. The primary network interface may be utilized during periods of otherwise low activity—for example, when virtual computing nodes on the hosts are relatively inactive—to transmit the format information. Another possibility is to utilize the low-bandwidth interface, but at a low transmission rate or during periods where comparatively little event information is being transmitted. The information may be stored locally until bandwidth is available for transmission. In some embodiments, determination of a new format may be delayed until bandwidth is available for transmission. In some cases and embodiments, information used to determine format information may be retained in log records stored locally, which may then be processed to determine the new format.

Figure 6:
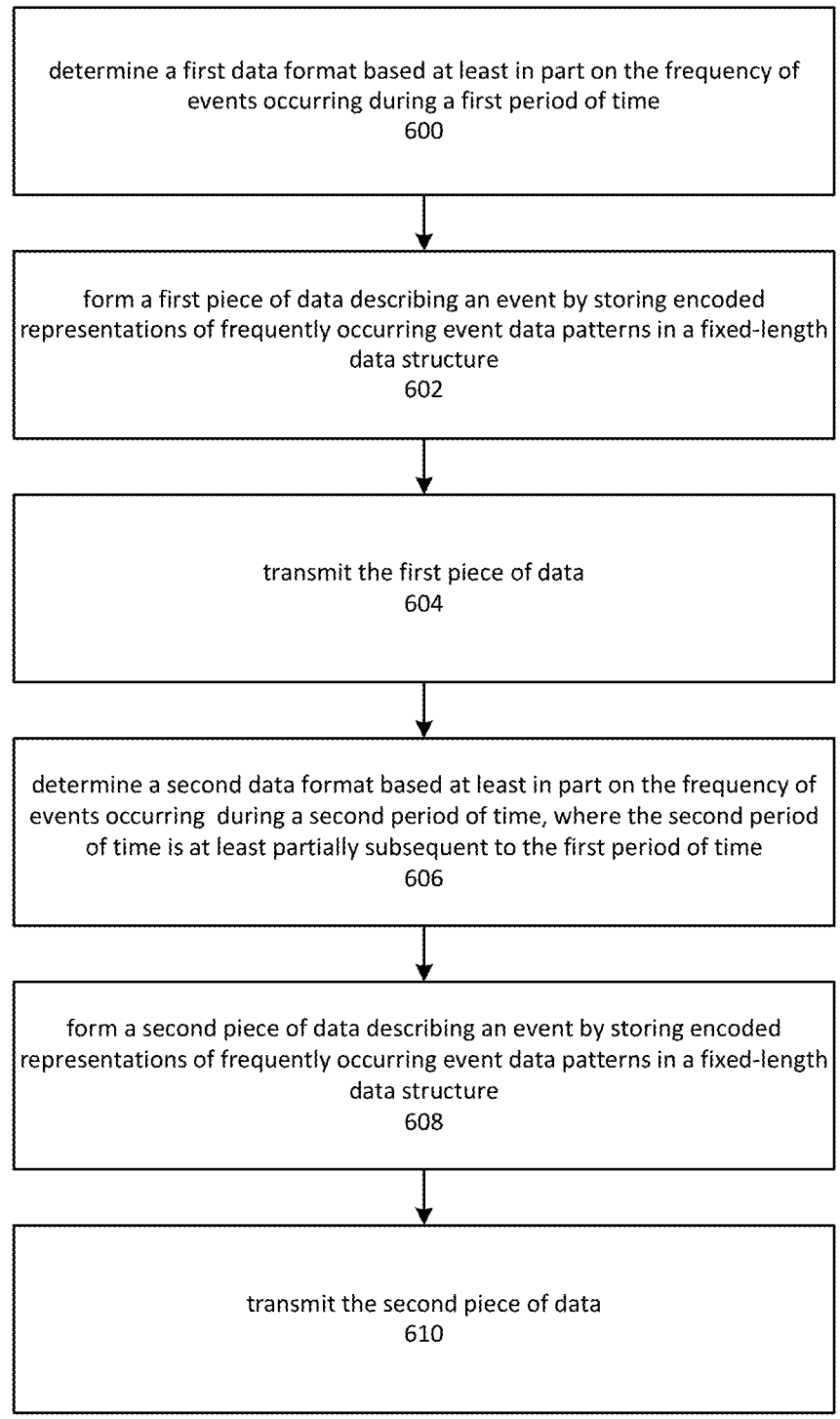
FIG. 6 depicts an embodiment of a process for dynamic encoding of events occurring on a cluster of computing nodes.

FIG. 6 depicts an embodiment of a process for dynamic encoding of events occurring on a cluster of computing nodes. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel.

Operation 600 involves determining first data format for event data to be transmitted, based at least in part on the frequency of events occurring during a first period of time. Next, at operation 602, a first piece of data may be formed to represent an event. The data may be formed by encoding and storing representations of frequently occurring data patterns into a fixed-length structure based on the encoding defined in the first data format. The formed data may then be transmitted to a recipient, as depicted by operation 604. Information describing the first data format may be transmitted by an out-of-band communications channel to the recipient before or after transmission of the first piece of data.

Operation 606 involves determining a second data format using additional data accumulated during a second period of time at least partially subsequent to the first period of time. The second data format may be determined based at least in part on the frequency of events occurring during this period of time. Embodiments may include data format representations of events occurring with a frequency that is above a threshold amount, and may exclude events that occur with a frequency that is below a threshold amount.

Next, a second piece of data may be formed, as depicted by operation 608, to describe a second event that has occurred during or after the second period of time. The second piece of data may be formed by encoding patterns of data that most frequently recur during the second period of time and by storing the encoded values in a fixed-length data structure. As depicted by operation 610, the formed second piece of data may then be transmitted to a recipient.

In some cases and embodiments, information that describes events may be stored by the recipient in response to determining that information needed to understand the format is not yet available. Upon receipt of the relevant information at operation 610, embodiments may process event descriptions received previously but not yet processed.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 7:
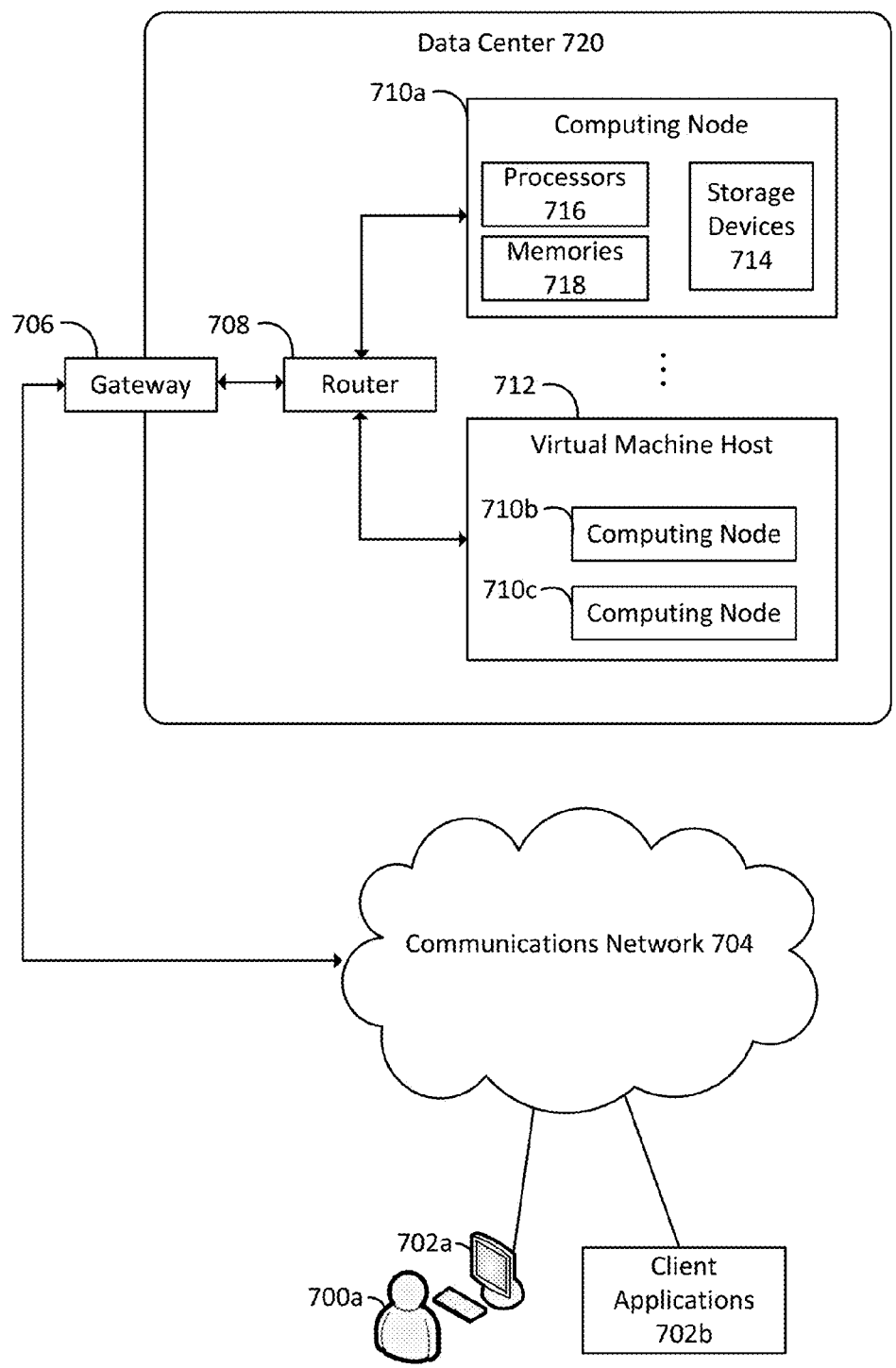
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b and 710c within a data center 720. Alternatively, client applications 702b may communicate without user intervention. Communications network 704 may comprise any combination of communications technology, including the Internet, wired and wireless local area networks, fiber optic networks, satellite communications and so forth. Any number of networking protocols may be employed.

Communication with processes executing on the computing nodes 710a, 710b and 710c, operating within data center 720, may be provided via gateway 706 and router 708. Numerous other network configurations may also be employed. Although not explicitly depicted in FIG. 7, various authentication mechanisms, web service layers, business objects or other intermediate layers may be provided to mediate communication with the processes executing on computing nodes 710a, 710b and 710c. Some of these intermediate layers may themselves comprise processes executing on one or more of the computing nodes. Computing nodes 710a, 710b and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718 and one or more storage devices 714. Processes on computing node 710a may execute in conjunction with an operating system or alternatively may execute as a bare-metal process that directly interacts with physical resources, such as processors 716, memories 718 or storage devices 714.

Computing nodes 710b and 710c are depicted as operating on virtual machine host 712, which may comprise a computing device and additional hardware and/or software components that provide shared access to various physical resources, such as physical processors, memory and storage devices. Any number of virtualization mechanisms might be employed to host the computing nodes. Computing nodes 710*a* and 710*c* may be referred to as virtual computing nodes. Virtual machine host 712 may also comprise a host domain for managing virtual computing nodes operating on virtual machine host 712.

The various computing nodes depicted in FIG. 7 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
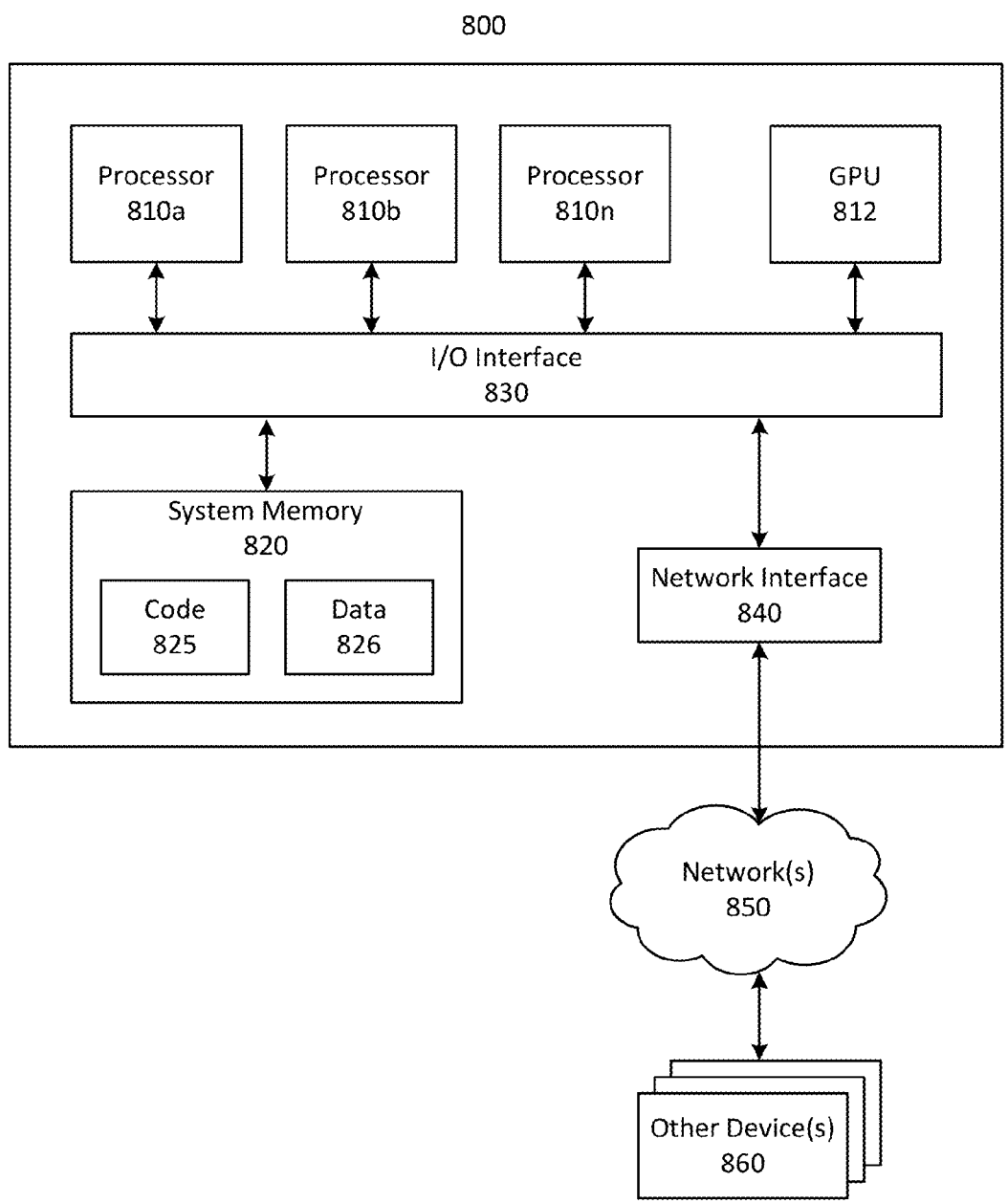
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. The general-purpose computer system may be configured, through programming instructions and/or hardware, to serve as a domain host. FIG. 8 depicts a general-purpose computer system that includes or is configured to access one or more computer-accessible media. In the illustrated embodiment, computing device 800 includes one or more processors 810*a*, 810*b* and/or 810*n* (which may be referred to herein singularly as a processor 810 or in the plural as the processors 810) coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between processor 810, system memory 820 and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++ and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
    a first one or more computing nodes, the first one or more computing nodes configured to process event information, the first one or more computing nodes communicatively coupled, by a controller, to one or more computing devices configured as a host for one or more virtual computing nodes;
    one or more memories having stored thereon computer readable instructions that, upon execution by the first one or more computing nodes, cause the system at least to:
        receive, at the first one or more computing nodes, a first data of a fixed length, the first data indicative of a first event of a first plurality of events occurring during a first period of time on at least one of the first one or more virtual computing nodes;
        receive, at the first one or more computing nodes, information indicative of a first data format for the first data, the first data format for the first data based at least in part on a frequency of the first event in the first plurality of events;
        initiate a response to the first event based at least in part on the first data and the first data format;
        receive, at the first one or more computing nodes, a second data of the fixed length, the second data indicative of a second event of a second plurality of events occurring during a second period of time on at least one of the one or more virtual computing nodes, the second period of time at least partially subsequent to the first period of time;
        receive, at the first one or more computing nodes, information indicative of a second data format for the second data, the second data format determined based at least in part on a frequency of the second event in the second plurality of events, the frequency of the second event in the second plurality of events being greater than the frequency of the first event in the first plurality of events; and
        initiate a response to the second event based at least in part on the second data and the second data format.

2. The system of claim 1, wherein the first data format comprises a first bit region corresponding to a service definition and a second bit region corresponding to an error condition.

3. The system of claim 1, wherein the second event corresponds to a service operating on the one or more virtual computing nodes during the second period of time but in less than all of the first period of time.

4. The system of claim 1, further comprising one or more memories having stored thereon computer readable instructions that, upon execution by the first one or more computing nodes, cause the system at least to:
determine the response to the second event based at least in part on a subset of the second data, the subset of the second data located based at least in part on the second data format.

5. The system of claim 1, further comprising one or more memories having stored thereon computer readable instructions that, upon execution by the first one or more computing nodes, cause the system at least to:
identify at least one service or device that became operable on at least one of the one or more virtual computing nodes after the first period of time;
determine a frequency of events associated with the service or device; and
determine the second data format based at least in part on encoding a value to represent the at least one service or device.

6. A method comprising:
determining, by one or more computing devices, a first format for transmitting data indicative of a plurality of events occurring on one or more virtual computing nodes, the first format having a first length, wherein determining the first format comprises determining a first representation of a first event of the plurality of events, the first representation having a length less than or equal to the first length;
transmitting, by the one or more computing devices, data indicative of the first event of the plurality of events using the first format and the first representation;
transmitting, by the one or more computing devices, data indicative of the first format;
determining, by the one or more computing devices, to transmit data indicative of a second event of the plurality of events using a second format instead of the first format, the determining based at least in part on relative frequencies of the first event and the second event in the plurality of events, the second format having the first length, the second format comprising a second representation of the second event, the second representation having a length less than or equal to the first length;
transmitting, by the one or more computing devices, the data indicative of the second event using the second format; and
transmitting, by the one or more computing devices, data indicative of the second format.

7. The method of claim 6, wherein the first format comprises a first bit region corresponding to a service definition and a second bit region corresponding to an error condition.

8. The method of claim 6, wherein the first event corresponds to a service operating on the one or more virtual computing nodes.

9. The method of claim 6, wherein the second event corresponds to a service that began operating on the one or more virtual computing nodes after determination of the first format.

10. The method of claim 6, further comprising:
determining, by the one or more computing devices, a response to the second event based at least in part on the second format and based at least in part on the second representation.

11. The method of claim 10, wherein the response to the second event is determined to be indicative of preserving a state associated with at least one of the one or more virtual computing nodes.

12. The method of claim 6, further comprising:
identifying, by the one or more computing devices, at least one service that became operable on at least one of the one or more virtual computing nodes after determination of the first format;
determining, by the one or more computing devices, a frequency of events associated with the service; and
determining, by the one or more computing devices, the second format based at least in part on encoding a value to represent the at least one service.

13. The method of claim 6, further comprising:
identifying, by the one or more computing devices, a computing node added to the one or more virtual computing nodes after determination of the first format; and
determining, by the one or more computing devices, the second format based at least in part on encoding a value to represent the computing node that was added.

14. A non-transitory computer-readable storage medium having stored thereon instructions that, upon execution by a computing device, cause the computing device at least to:
process a first data of a fixed length, the first data indicative of a first event that has occurred on one of one or more virtual computing nodes, wherein processing the first data is based at least in part on a first format for the first data, the first format based at least in part on a first frequency of events occurring on the one or more virtual computing nodes during a first period of time; and
process a second data of the fixed length, the second data indicative of a second event that has occurred on at least one of the one or more virtual computing nodes, wherein processing the second data is based at least in part on a second format for the first data, the second format determined based at least in part on a second frequency of events occurring on the one or more virtual computing nodes during a second period of time, the second period of time at least partially subsequent to the first period of time.

15. The computer-readable storage medium of claim 14, wherein the first format comprises a bit region corresponding to a service definition and a bit region corresponding to an error condition.

16. The computer-readable storage medium of claim 14, wherein the second event corresponds to a service operating on the one or more virtual computing nodes during the second period of time.

17. The computer-readable storage medium of claim 14, comprising further instructions that, upon execution by the computing device, cause the computing device to at least:
determine a response to the second event based at least in part on a subset of the second data, the subset of the second data located based at least in part on the second format.

18. The computer-readable storage medium of claim 14, comprising further instructions that, upon execution by the computing device, cause the computing device to at least:
identify at least one service or device that became operable on at least one of the one or more virtual computing nodes subsequent to the first period of time;
determine a frequency of events associated with the service or device; and determine the second format based at least in part on encoding a value to represent the at least one service or device.

19. The computer-readable storage medium of claim 14, comprising further instructions that, upon execution by the computing device, cause the computing device to at least:
store the second data in response to determining that the second format is not accessible for processing the second data, store the second data prior to processing; and
processing the second data in response to the second format becoming accessible.

20. The computer-readable storage medium of claim 14, comprising further instructions that, upon execution by the computing device, cause the computing device to at least:
determine the second format based at least in part on excluding, from the second format, events whose frequency in the second period of time is below a threshold amount.

* * * * *